United States Patent [19]

Gharachorloo

[11] Patent Number: 4,495,646
[45] Date of Patent: Jan. 22, 1985

[54] ON-LINE CHARACTER RECOGNITION USING CLOSED-LOOP DETECTOR

[76] Inventor: Nader Gharachorloo, H3F Lansing W., Ithaca, N.Y. 14850

[21] Appl. No.: 370,084

[22] Filed: Apr. 20, 1982

[51] Int. Cl.³ ............................................. G06K 9/24
[52] U.S. Cl. ....................................... 382/13; 382/59
[58] Field of Search ..................... 382/3, 13, 15, 59; 340/347 P; 178/18-20; 73/432 A

[56] References Cited

U.S. PATENT DOCUMENTS

| Re. 30,048 | 5/1979 | Moss | 340/146.3 |
|---|---|---|---|
| 3,145,367 | 8/1964 | Crane | 340/146.3 |
| 3,182,291 | 5/1965 | Nassimbene | 340/146.3 |
| 3,199,078 | 8/1965 | Gaffney | 340/146.3 |
| 3,333,248 | 7/1967 | Greenberg et al. | 382/15 |
| 3,462,548 | 8/1969 | Rinder | 382/13 |
| 3,487,371 | 12/1969 | Frank | 340/146.3 |
| 3,531,798 | 9/1970 | Dureau | 340/347 P |
| 3,676,848 | 7/1972 | Hall | 340/146.3 |
| 3,835,453 | 9/1974 | Narayanan | 340/146.3 |
| 3,906,444 | 9/1975 | Crane et al. | 382/59 |
| 3,930,229 | 12/1975 | Crane | 340/146.3 |
| 3,996,557 | 12/1976 | Donahey | 340/146.3 |
| 4,241,409 | 6/1980 | Nolf | 340/146.3 |
| 4,421,980 | 12/1983 | Kühne | 340/347 P |

OTHER PUBLICATIONS

Advances in Recognition of Handprinted Characters, Ching Y. Suen, Marc Berthod*, and Shunji Mori**, 1978.

On-Line Computer Recognition of Proposed Standard ANSI(USASI) Handprinted Characters, M. R. Ito and T. L. Chui, 1978, vol. 10, pp. 341-349.

An On-Line Data Entry System for Hand-Printed Characters, H. D. Crane and R. E. Savoie, Mar. 1977.

Primary Examiner—Leo H. Boudreau
Attorney, Agent, or Firm—Barnard & Brown

[57] ABSTRACT

An on-line handwritten character recognition system utilizing a novel "closed-loop" type detector. The detector senses the direction of movement of the writing element across the writing surface, and is constrained in generation of strings of directions traveled to traverse all intervening directions between any two traveled by the writing element by requiring the detector to move only between adjacent directions.

17 Claims, 11 Drawing Figures

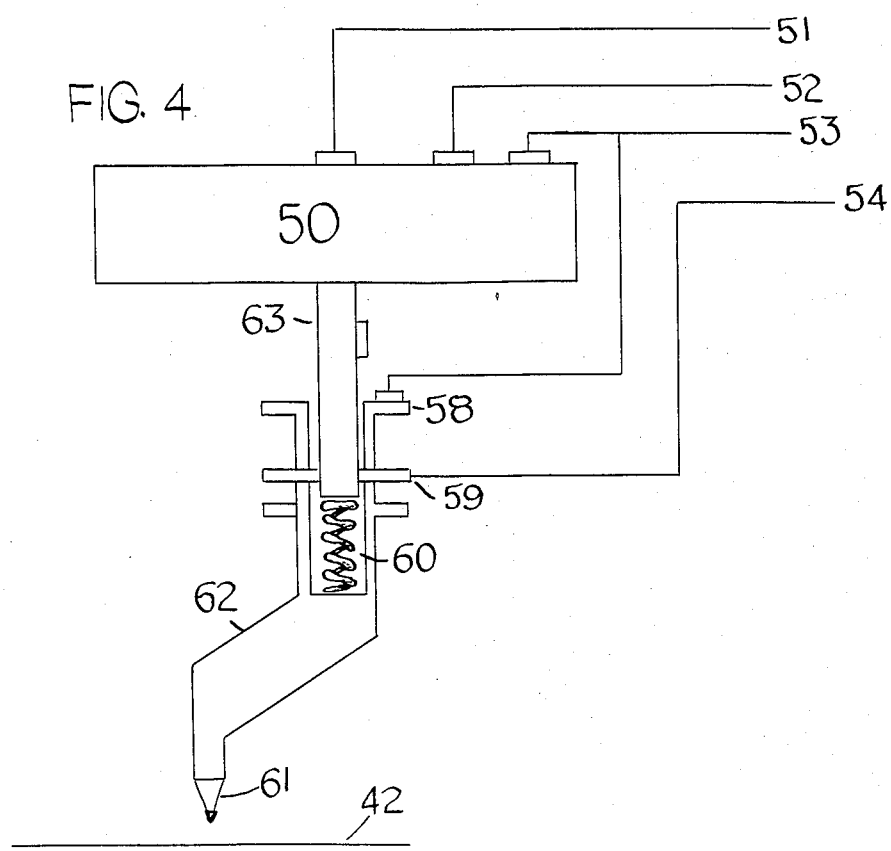
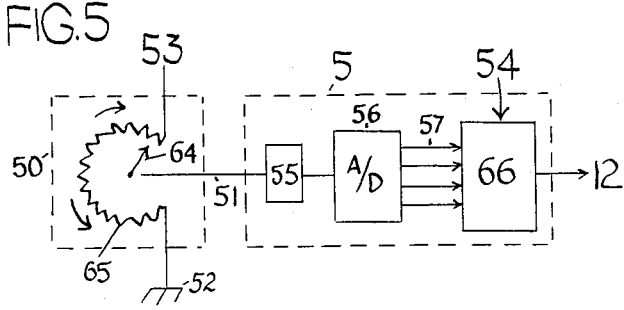
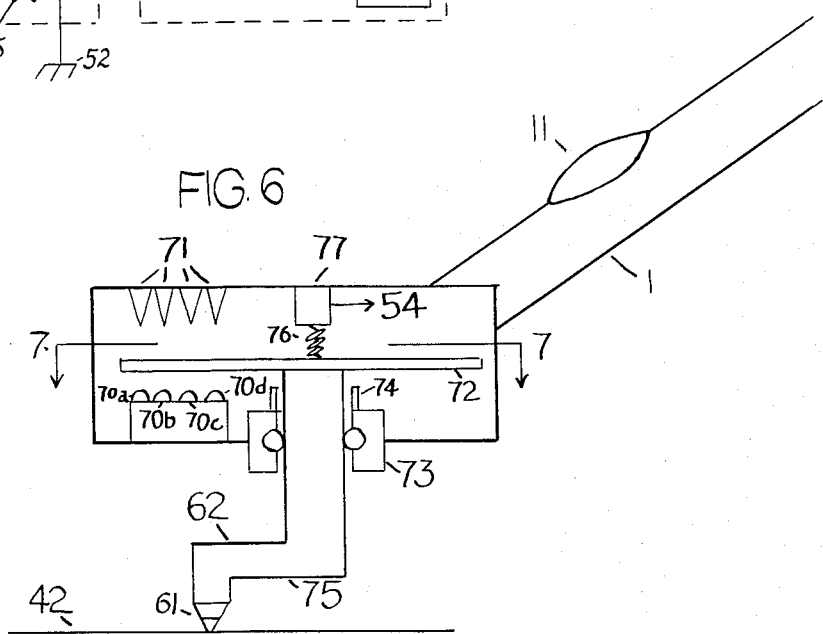

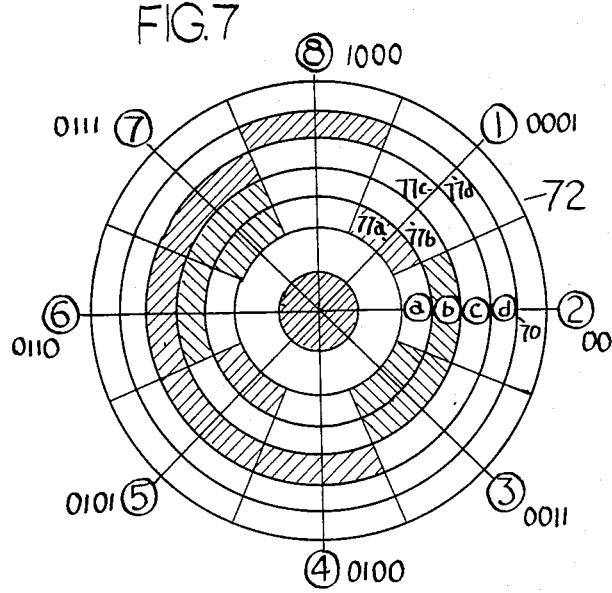
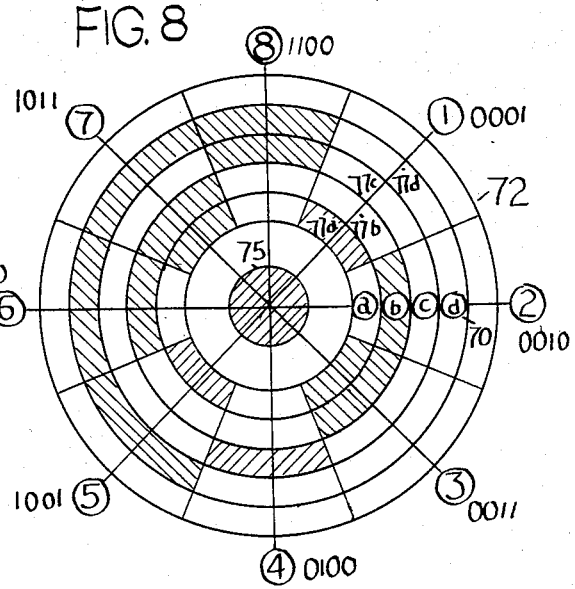
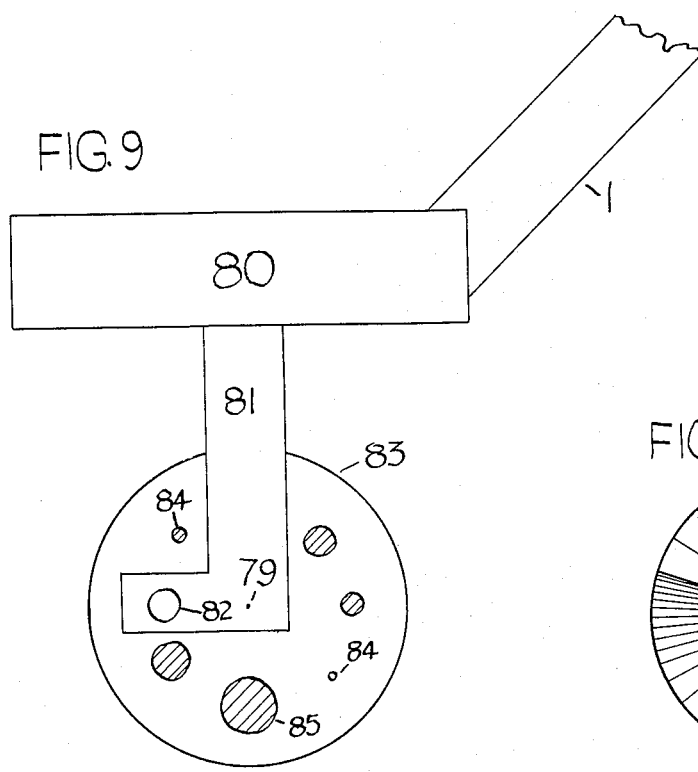
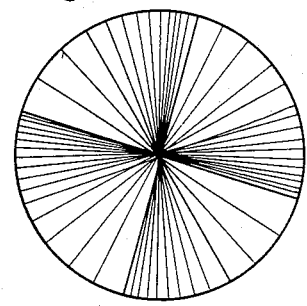
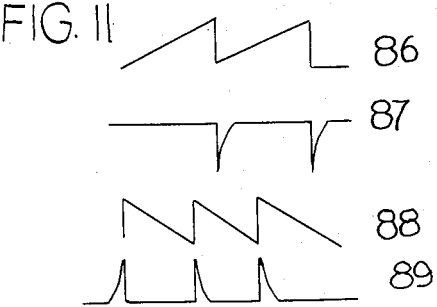

ON-LINE CHARACTER RECOGNITION USING CLOSED-LOOP DETECTOR

FIELD OF THE INVENTION

The invention pertains to systems and methods for computer recognition of handwritten characters. More specifically, the invention pertains to systems and methods of detection and recognition of handwritten characters as they are being written, i.e. in "real time."

BACKGROUND OF THE INVENTION

One of the most frequently recurring problems in the use of computers is the "man-machine interface." That is, how does the user of a computer or other digital system make his wishes known to the system in a form which the system will recognize?

The earliest systems for human input to computers or other digital communications systems (after the early, clumsy, direct binary systems) were based on the familiar typewriter. The Teletype TM was used in communications long before the advent of computers, and most early computer systems adopted the Teletype TM, or a close relative, as a natural input medium, whether to input data directly into a computer or through an intermediate medium such as cards or tape. Today, the keyboard, in one embodiment or another, remains probably the most common mode of data input to computer systems, and to digital data communications systems (i.e. Telex, Tymnet, TWX, etc.) as well. The Bell System's communications program for the deaf is based on the Teletype TM or its descendents.

As common as it is, the typewriter is not the most natural of communications media for most people. Training and practice are required to type accurately and well. This is especially intimidating to those with no background in computers. As the use of computers becomes more widespread, however, the need for those unskilled in computer concepts to communicate with computers is growing. It has been recognized for some time by those in the field that some alternate, more natural, method of man-machine communications is needed.

The most natural modes of communication for the majority of people are speech and writing. Obviously, the ideal input mode for many applications would be speech recognition. Although some advances have been made in this field, direct voice input remains impractical at this time. For the deaf, it will never be practical.

It is thus an object of this invention to provide a means for communications with a computer or other digital communications medium through the recognition by the system of a user's handwriting.

Since at least the early 1960's, systems have been available for optical character recognition (OCR) of handprinted characters on documents. One such system is the IBM Model 1287 OCR reader, which is commonly used in such systems as bulk reading of numbers printed on sales slips, utility bills, etc. OCR systems are expensive, complicated, and limited in scope to a small number of handprinted characters (usually numbers) and a slightly larger set of specially designed printed characters (the OCR-A and OCR-B type fonts). They are very sensitive to position of the print on the document and to size and quality of the print. OCR systems are by their nature practical primarily for large batch applications on large, high-speed computer systems. They ae not useful for "real time" on-line communication of data by a user to a computer or data communications system (hereinafter simply "computer").

It is thus a further object of the invention to provide a simple, inexpensive, method of handprinted communications by a user to a computer in "real-time" which is not sensitive to the location or size of the handprinting, and which is not limited to a small character set.

A number of methods of on-line character recognition have been proposed in the past. Most of these systems utilize a special pad or tablet which locates a special pen through the use of a wire grid, ultrasonic reflections, or resistive detection. See, for example, Hall, et. al., U.S. Pat. No. 3,676,848; Donahey, U.S. Pat. No. 3,996,557; Frank, U.S. Pat. No. 3,487,371. Some use templates or overlays to constrain the formation of characters, which must then conform to a special sequence of strokes (Moss, U.S. Pat. No. Re. 30,048), or sense proximity of a pen to a sensing strip, which requires the user to write parallel to, and a specific distance from, the strip (Nassimbene, U.S. Pat. No. 3,182,291). All of the systems using sensing on a special tablet or template restrict the handwriting to that device. The size and/or location of the writing is critical. There may be resolution problems if the spacing between sensing elements of the sensing grid is too large. Alignment of the characters with the grid is critical. Simultaneous data entry onto a manual form or list and into the computer is difficult or impossible, since most of the systems cannot tolerate the interposition of a paper form between tablet and stylus.

It is, therefore, a further object of the invention to provide an on-line handwriting recognition system which is independent of the medium being written upon, which does not require any special tablet or template, and which is, with broad limits, insensitive to size and orientation of the characters written.

In search of such a system, several inventors have previously devised tablet independent devices. For examples, see Nolf, U.S. Pat. No. 4,241,409; Crane, et al., U.S. Pat. Nos. 3,930,229 and 3,145,367; Narayanan, U.S. Pat. No. 3,835,453; and Gaffney et al., U.S. Pat. No. 3,199,078. Each of these shows a stylus capable of detection of a plurality (usually 4) of directions. As each of these inventors has realized, handwritten characters can be recognized by looking at the directions the stylus has traveled between being placed on the paper ("pen down") and being lifted at the end of a character or segment ("pen up"). Ignoring the distance the pen moves allows the system to be independent of character size.

These systems generally comprise a moving contact attached to the pen point which can touch any one of a number of contacts (usually 4) to indicate which direction the pen is traveling. The sequence of directions is stored and compared to a table to determine the character written. Typically, a "tree" structure, as shown in Crane, U.S. Pat. No. 3,930,229, is used, or the exact list of directions is compared to a table, as in Crane, U.S. Pat. No. 3,145,367. A circuit, often a read-only-memory type device, is set up to recognize a set of characters, which must be written in the predetermined way.

Experimentation has shown that each of these systems has several major problems in practical use. The most important of these is that in each of these systems the stylus indicator is free to move from any direction to any other direction, a condition I term "open loop". That is, in the four direction systems used (up, down, left, right), each may generate a string such as "up, left, right" as a valid string (see Crane, U.S. Pat. No. 3,145,367, "4" in FIG. 4). In theory, this will work. In practice, however, the pen will tend to wiggle from direction to direction as the user writes, causing a large number of random errors to be introduced into the string. Even a single introduced error in direction will cause the sytem to fail. When more than four directions are sensed, this failure of the "open loop" system becomes even more pronounced.

I have found that four-direction sensing is wholly inadequate for full alphanumeric character recognition. The resolution is not accurate enough to allow flexibility in formation of characters, which is a very important object of my invention. As an example, FIG. 4 of Crane, U.S. Pat. No. 3,145,367, shows a chart giving the codes generated using a four-direction detector. As can be seen, Crane's detector cannot distinguish an "A" from a "1" unless the letter is crossed from right to left, a very unnatural way of writing. The optimum resolution I have found is eight directions, although, in an English system "northwest" could be combined with "north", and seven direction resolution would suffice. Using the preferred eight-direction sensing the "open loop" detectors become effectively useless. The random direction "noise" caused by "wiggling" of the pen obscures the characters to be detected.

In addition to the detector problems, the recognition systems described in the prior art suffer from large storage requirements (three to four "bits" per direction, using eight direction resolution) and inflexibility of character formation.

It is an object of this invention to provide a character recognition system which can use a minimum of storage, and allow a maximum of flexibility in character formation.

SUMMARY OF THE INVENTION

An on-line, handwritten character recognition system is provided, which uses a "closed-loop" detector.

A "closed-loop" detector is one in which, once the initial direction is chosen, the stylus is constrained to move only to adjacent directions in a clockwise or counterclockwise direction. Thus, a resolution of eight or more directions can be used without introducing errors due to random "wiggling", as in "open-loop" detectors. Storage requirements may be minimized by storing a single bit (0=CW, 1=CCW) for each direction, (plus four bits for the final direction (last before "pen up")) since the detector can only go in two directions from any point.

Several embodiments of the "closed-loop" detector will be presented below, but it will be understood that others are possible, within the teachings of the invention.

The sequence of directions sensed by the detector is stored. When "pen up" is sensed, the sequence is matched with a set of stored directions. One preferred method of comparison is indicated in the detailed explanation below.

In many methods, distortions can be introduced by randomness or inaccuracy in the initial pen direction if the "pen down" is sensed before the user actually moves the pen in the first direction. This is minimized in one embodiment by ignoring the initial direction and matching on the final direction plus a number of direction bits prior to the final.

BRIEF DESCRIPTION OF THE DRAWINGS

FIG. 4 shows a second embodiment of the detector, using a potentiometer as the sensing element.

FIG. 5 shows a block diagram of the potentiometer type detector.

FIG. 6 shows a third, preferred, embodiment of the detector, using a photoelectric digitizer for direct digital encoding of pen direction.

FIGS. 7 and 8 show details of alternate disks which may be used in the digital encoder.

FIG. 9 shows details of a cylindrical pen element which may optionally be used with a closed-loop detector in the invention.

FIG. 10 shows an alternative embodiment of the cylindrical stylus point.

FIG. 11 shows waveforms output from the cylindrical stylus point.

DESCRIPTION OF THE PREFERRED EMBODIMENT

Figure 1:
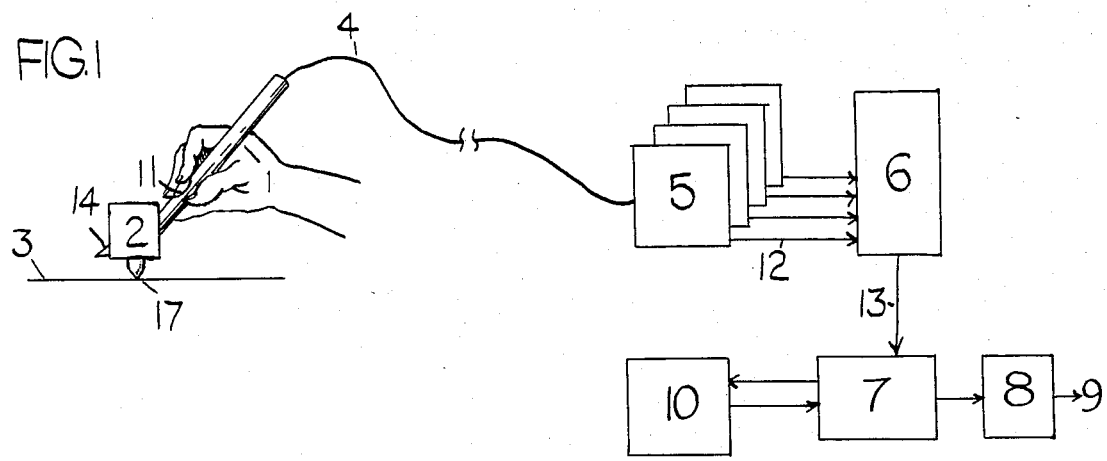
FIG. 1 shows a block diagram of the invention in use.

Referring to FIG. 1, the system derives its input from a closed-loop detector stylus (1) with which the user writes in a normal manner. The end of the stylus may be constructed at an angle to the handle, as shown (2), so that the stylus tip (17) may meet the writing surface (3) at or near a perpendicular manner, while still allowing the user to grasp the handle at a comfortable angle. As will be seen in greater detail below, the stylus tip (17) preferably will contain means for marking the writing surface, such as a pen or pencil, for ease of use. A pointer (14) indicates the proper orientation of the stylus, relative to the written line.

The stylus output signal is carried by a flexible conductor (4) of any conventional type, preferably a thin wire, but possibly a fiber-optic conductor or even a wireless system, to a preprocessor (5) which converts the stylus output to a digital form (12), and generates a signal (13) for input to the recognition logic (7) in a single user system, or, as shown, into a multiple-stylus scanning receptor (6) which allows multiple users on a single recognition system. Through appropriate design of the preprocessor (5), detectors of various types, such as those described below, may be intermixed on a single system.

In one possible embodiment, the preprocessor (5) could reside in a subscriber's telephone set at his home or office, and the signal (12) could comprise a set of coded tones (for example, the four row or column Touchtone ™ tones) input via the telephone line to a receptor (6) at the telephone company central office. The decoded output of the system (9) could then be used for input to a digital network, or transmitted to a receiver at another subscriber's location. Such a system would prove to be practical for communication between deaf persons as a compatible substitute for the current teletype-based system, or perhaps in a packet switched electronic mail system.

The receptor output (13), comprising coded strings of directions, as detailed below, is matched by the decoding logic (7) against a table stored in some form of memory (10). In the preferred embodiment, the memory can be updated with the user's own characters, so that it can "learn" each individual user's handwriting. The recognized character, or some indication of non-recognition is converted to a usable form (for example, a serial ASCII code, or a set of tones) by an encoder (8) and output to a computer (9).

As an aid to decoding, the stylus may include a "space bar" (11) to allow the user to indicate spaces between words or numbers, or for use as an "enter" key.

THE CLOSED LOOP DETECTOR

The invention is based upon the use of a "closed loop" type detector. The detector is one in which pen movement is constrained to follow a closed path from direction to adjacent direction. Thus, if the pen is traveling "north" (up the page) and the next stroke is "southeast" (down and right), for example in the letter "M", the detector must pass through northeast and east.

This provides a major advance in "noise" immunity and efficiency. The detector becomes far less sensitive to the normal wiggling of the writing hand, since the detector can move only uni-directionally (circularly). Since it is only necessary to know if the next direction was clockwise or counterclockwise of the present direction, a character sequence need only comprise a final direction (4 bits), optionally a count (4 bits), and a string of ones and zeros indicating the directions comprising the character. For a character having ten directions (that is, the detector changes direction ten times during the period between "pen down" and "pen up", signals) this represents a savings of 22 bits, or a reduction in storage requirements of 55%, over an "open loop" system storing each direction discretely.

Many embodiments of closed loop detectors are possible within the teachings of the invention. Several of the preferred embodiments are detailed below. In reverse order of preference, those are a mechanical "raceway" system, a potentiometer system, and a system based on direct digitization of pen direction.

Figure 2:
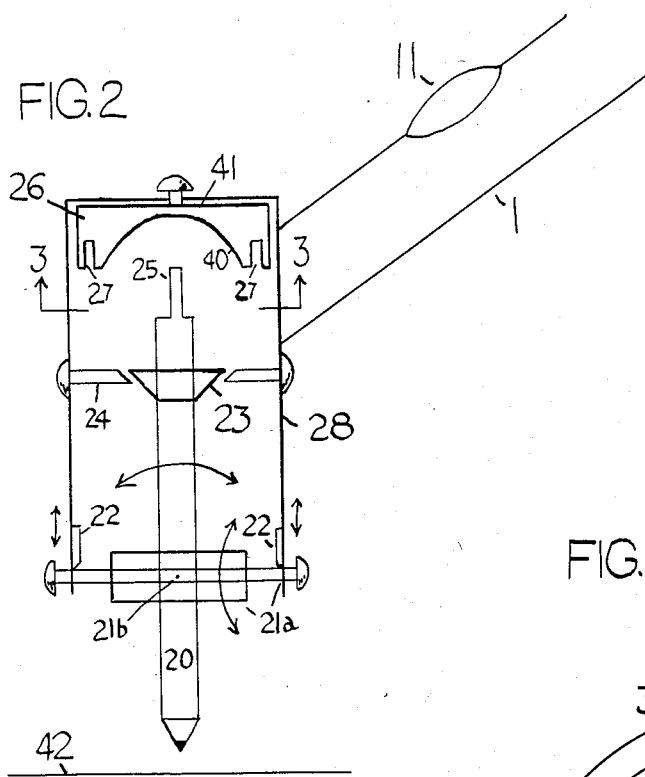
FIG. 2 shows a first embodiment of the closed-loop detector, using a mechanical "raceway" type encoder.
Figure 3:
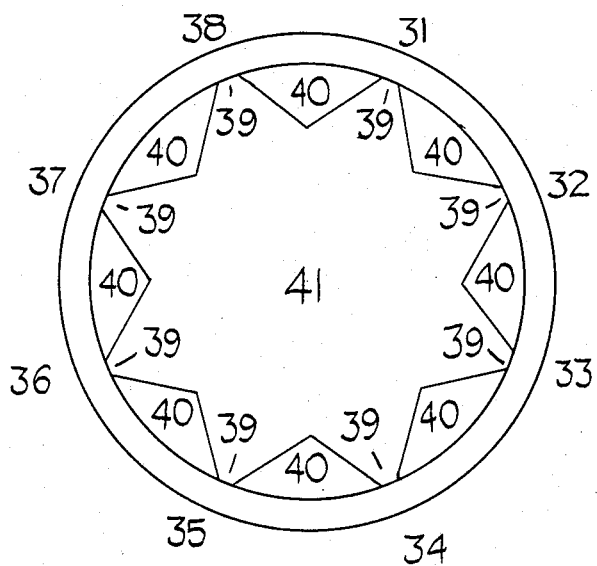
FIG. 3 shows a detail of the "raceway".

FIGS. 2 and 3 show the details of the "raceway" detector. This embodiment is the closest to the prior-art "open loop" designs, using a sensing pin (25) which can trigger a plurality of direction sensors (31) through (38). This may be done through the use of an LED on the pin shining onto eight photodetectors, or through actual contact between the pin and eight conductive plates.

The pin (25) is mounted on, or formed by, the end of the stylus writing pen (20) opposite the paper (42). The pen is mounted on pivots (21a) (21b) allowing it to pivot freely. The pivots are slidably (22) mounted in the stylus case (28) permitting the pen (20) to move up into the case (28) as the stylus is placed on the paper. The pen collar (23) is forced off its seat (24), which causes the generation of the "pen up" signal, and the pin (25) is pushed upward until it contacts the center (41) of the pin guide block (26), mounted on the top of the case.

The design of the pin guide block (26), which is preferably molded from a rigid plastic material, transforms the prior-art type open loop detector into the closed loop detector of the invention. FIG. 2 shows a cut-away side view, and FIG. 3 a "pin's eye view" of the guide block. When the pen is first pressed to the paper, the pin (25) rests in the center of the block (26), in a bowl-like depression (41). As the pen (20) is moved along the paper (42), it pivots (21) and the pin (25) rides up the side of the bowl (41). Guides (40) channel the pin (25) directly toward one of the eight direction detectors (31)–(38) through guide slots (39). As soon as the pin (25) passes through the guide slot (39), it drops into the raceway (27), a deep slot extending around the entire periphery of the block (26), in which the detectors (31 et. al.) are located. Once in the raceway (27) the pin (25) cannot move in any direction except along the raceway (27) in a clockwise or counterclockwise direction, thus forcing the closed loop detection. When the pen (20) is lifted, the pin (25) is pulled vertically out of the raceway (27) and re-centers, ready for the next character.

For ease of use, at some expense in linearity, the block (26) or raceway (27) may be formed in an oval configuration, since most English letters are primarily north-south in orientation.

The outputs of the eight detectors and the pen-down signal would be input to the preprocessor circuit represented by (5) in FIG. 1, to be converted to a binary 1–8 or 0–7 signal.

Experimenting with the raceway detector gave rise to the conclusion that a simpler method was needed. This led to the development of the potentiometer based closed loop detector, shown in FIGS. 4 and 5.

In this embodiment, the direction information is sensed by a 360° travel potentiometer (50) mounted in the stylus (at (2) in FIG. 1) with the shaft (63) of the potentiometer (50) substantially perpendicular to the paper surface (42). The pen (61) is mounted off-center on an offset arm (62), which provides the mechanical advantage to turn the potentiometer (50) as the pen (61) changes direction on the paper (42).

A set of contacts (58) (59) on a spring-loaded (60) arm may be used to generate the "pen-down" signal (54), as shown.

As will be seen in FIG. 5, the potentiometer shaft (63) turns the potentiometer wiper element (64) along the resistance element (65), generating a varying voltage (Vdir) (51), from a positive supply (V+) (53) to ground or a negative supply (V−) (52) as required. The voltage (51) is input to an analog to digital (A/D) converter (56) of conventional design, which provides a digital output (57). A code conversion step (66) will be needed to combine the A/D converter output (57) and the pen-down signal (54) and provide the proper digital signal (12) (i.e. 0 to 8) for recognition.

It is preferable to include a circuit (55) between the potentiometer (50) and the A/D converter (56) to handle the transition condition between Vdir=V+ and Vdir=V−, as the potentiometer wiper (64) crosses the break in the resistance element (65). This circuit, a comparator of conventional design, should act to force the output to either V+ or V− (preferably V+ if the pot is oriented such that the break occurs at "north") if Vdir is within a few percent (1% to 5%) of either extreme. This will eliminate the problem of mis-reading the detector as it crosses the break point. As noted by the dotted line in FIG. 5, the combination of circuits (55) (56) and (66) represent the preprocessor (5) in FIG. 1.

A third embodiment for the closed-loop detector is illustrated in FIG. 6. This embodiment uses direct digitization of the pen direction. The digitization can be done through the use of any of the known techniques for shaft encoding, but the preferred method, as illustrated, uses an optical encoding disk (72) interposed between light sources (such as light emitting diodes (LEDs)) (71) and a set of photo-detectors of any convenient type (70). Photoelectric encoding is preferred because it does not cause any additional drag on the pen (61) (as a mechanical encoder could) which might tend to distort the direction of the pen.

The design shown uses four LED/photo-detector pairs (70a, b, c, d), one pair for each of the four bits to be encoded. If desired, the eight directions could be encoded in 3 bits (0–7), and thus with three photo-detectors, but this is not preferred, as it eliminates the possibility of use of "0000" to represent "pen-up", without additional circuitry in the preprocessor (5).

The encoder disk (72) is attached to a ball-bearing (73) mounted shaft (75) which has an offset arm (62) and pen (61) at its lower end, as in the potentiometer-based detector. Detection of pen-up/pen-down (54) can be accomplished as in the potentiometer-based embodiment (see FIG. 4), or by allowing the shaft (75) and disk (72) to slide upwards against a spring (76) and switch (77) as shown in FIG. 6.

The advantages of the digitizer based detector are the savings in weight, complexity, and size over either of the earlier embodiments. The drag on the pen while changing direction is significantly lower, which aids detection. Since the stylus output is already in a digital form, the preprocessor (5) circuitry may be reduced to a set of buffers. FIG. 7 shows an encoder disk (72) which could be used to directly encode the binary values of the eight directions (0001 to 1000). The disk (72) divided concentrically into four tracks (77a to d) in positions corresponding to the four photodetectors (70a to d), and circumferentially into eight sectors (numbers in circles). The four tracks are shaded to block light flow between led and photodetector. A dark band in track "77a" indicates, in the embodiment shown, a bit in the least significant, or "1" position. Track "77b" corresponds to the "2" position, and so on, to the most significant, or "8" bit in tract "77d". Thus, direction "6" ("west") is directly encoded with dark bands in tracks 77b and 77c.

The illustrated embodiments of the potentiometer and digitizer based detectors suffer from the drawback that significant rotation of the detector may be required when changing direction. This can be especially acute when the pen is first placed on the paper. This effect can cause the detected initial directions of the detected character to be erroneous, transient directions caused by a pen rotation of as much as 180° required to align the detector with the true first direction.

FIG. 9 shows a cylindrical stylus which can be used with the previously described closed-loop detectors to minimize detector movement with direction change. The point comprises a wheel (83) mounted at the end of the detector shaft (81). A photodetector (82) is arranged so as to look through the wheel at a light source, such as an LED, in a corresponding position on the other side of the wheel (not shown). The wheel (83) is arranged so as to rotate freely on a pivot (79). Light shines through a plurality of holes in the wheel, arranged circumferentially in order from small (84) to large (85) onto a photodetector (82). Alternatively, the wheel could be made of a clear plastic material and shaded, as in FIG. 10. The wheels ae shown with two and four cycles of light intensity changes, but it will be recognized that any number may be used, so long as the spacing between dark areas is wide enough for the photodetector (82) to discern an increasing or decreasing trend of light intensity. As an alternative to the shaded disk, a potentiometer could be used, or any other known method of encoding rotation direction.

Using this design, the direction of wheel rotation may be determined. The detector output is a sawtooth (86) and (88). The direction of scope is determined by the direction of rotation. If the detector output is differentiated, as by a capacitor in series with the signal, a train of positive (89) or negative (87) pulses is generated; the polarity of which may be used to produce a signal corresponding to wheel rotation.

This wheel-direction signal may be combined with a digitizer encoder of the type described above, using an encoder disk of the type shown in FIG. 8. The three least significant bit (LSB) tracks 77a, b, and c, encode four directions. Opposite directions (i.e. north-south, southwest-northeast) may optionally differ in the most significant bit (MSB), track (77d). By looking at the three least-significant tracks plus the direction signal, the full eight directions can be distinguished. The maximum digitizer rotation is reduced to 90°, thus reducing the maximum transient error (i.e. how far off is the pen from the desired initial direction) to only two directions, from four. A reversal of direction (for example, in the middle of the letter "B") requires no movement of the digitizer, hence the number of directions to store at such a course reversal is reduced from four to one.

The cylindrical point pen will also allow a rough determination of distance from the number of pulses generated by the photodetector. This could be incorporated into some systems where distance information might be desirable. For example, in lower case letter detection the distance is significant because the only difference between "a" and "d" or "h" and "n" is the length of the "tail."

The ability to sense both direction and distance also allows the detector to be used as a replacement for the "mouse" currently used as a graphic input medium.

If distance only is significant, and not direction of rotation, the wheel need only interrupt the light beam, without shading to generate a digital pulse train. This might be of use in a signature verification system, or in digitization of designs.

In another embodiment, the photodetector-light pair are omitted completely. The stylus is then restricted to detection of four axes (eight directions paired as vertical, horizontal, slant left, slant right). This may be used with the character recognition system as taught by the invention, with some loss of resolution and ability to distinguish similar characters, but at a savings in storage space, since just two bits (0–3) could be used to indicate the four directions.

USING THE CLOSED LOOP DETECTOR

The output of the closed-loop detector is a string of numbers representing the directions detected by the stylus between "pen-down" and "pen-up". When "pen-up" is detected, any of a large number of known techniques can be used to match the resulting string to a table of possible combinations and their associated characters.

I have found that the look-up is made more efficient by use of a table keyed to the last direction detected, since there will not be any transient directions detected in that position. This would give eight lists of characters. The search can be further sped up by using two indexes into the table, say first and last directions, giving a "three dimensional" table of 8 by 8 entries. Thus, each list of characters will be significantly smaller.

The system can be made to "learn" new characters, or new ways of writing characters, simply by adding strings to the table and identifying them. This makes the system far more versatile and accurate, as many embodiments of each character will be recognized. "Special" characters may be easily included, such as Greek letters or mathematical symbols for scientific use. The system will thus adapt itself to new users without modification.

Accordingly, it is to be understood that the embodiments of the invention herein described are merely illustrative of the application of the principles of the invention. Reference herein to details of the illustrated embodiments are not intended to limit the scope of the claims which themselves recite those features regarded as essential to the invention.

I claim:

1. The method of recognizing handwritten characters being written by a stylus upon a writing surface, comprising:
   a. sensing stylus contact with the writing surface;
   b. sensing all directions traveled by the stylus upon the writing surface using a closed-loop detector;
   c. storing all directions sensed in the form of a data string;
   d. sensing the end of stylus contact with the writing surface;
   e. matching the stored string with a table of known strings.

2. A closed-loop detector for handwriting comprising:
   a. handle means for grasping by a user;
   b. stylus means for contacting and moving across a writing surface for writing thereon operably located at one end of the handle means;
   c. switch means connected to said pen means for generating a "pen-down" signal for indicating contact between the stylus means and the writing surface;
   d. direction detector means cooperating with the stylus means for generating a signal indicative of a plurality of directions of stylus means motion on the writing surface;
   e. said direction detector means being constrained to move only from one of the plurality of detected directions to the next adjacent direction.

3. The detector of claim 2 in which
   a. the stylus means comprises:
      case means having upper and lower ends;
      pivot means mounted in the case means adapted to move slidably along the case means between a first lower position to a second upper position;
      pen means having an elongated shaft with upper and lower ends; the lower end being adapted to writing upon the writing surface, and the elongated shaft being pivotally attached to the pivot means at a point between the upper and lower ends;
      said pivot means normally resting in the first position when the pen means is lifted from the writing surface, and acting to be moved from the first to the second position when the pen means is lowered to contact the writing surface;
   b. the direction detector means comprises:
      guide block means located within the upper end of the case means above the upper end of the pen means, such that the upper end of the pen means slidably contacts the guide block means when the pivot means is moved to the second upper position by contact between the lower end of the pen means and the writing surface;
      raceway means for guiding the upper end of the pen means, comprising a slot cut into the guide block means around the entire periphery of the guide block means of sufficient width and depth such that the upper end of the pen means will fit and move freely therein whereby the upper end of the pen means is constraining while the pivot means is in the second position, to remain in the raceway means and travel around said raceway means as the pen means pivots in the pivot means while the lower end of the pen means is moved around the writing surface;
      a plurality of position detector means for detecting the presence of the upper end of the pen means in a segment of the raceway means whereby the direction of movement of the lower end of the pen means across the writing surface may be sensed through detection of the position of the upper end of the pen means in the raceway means.

4. The detector of claim 3 in which the raceway means is elliptical in shape.

5. The detector of claim 2 in which the direction detector means is a potentiometer having a shaft and a variable resistance output proportional to shaft position and adapted to mating with the stylus means capable of 360° rotation and an analog to digital conversion means for conversion of the variable resistance output to a number representing shaft position, whereby the direction of pen movement is represented as a variable resistance and converted to a digital number.

6. The detector of claim 5 further comprising comparator means for forcing the direction detector output to a chosen value when the potentiometer is within one to five percent of its minimum or within one to five percent of its maximum value, whereby distortions induced by transition from minimum to maximum resistance are eliminated.

7. The detector of claim 5 in which the stylus means is mounted at one end of an offset arm, the other end of which is attached to the shaft of the potentiometer, whereby the drag or stylus movement on the writing surface causes the potentiometer shaft to turn.

8. The detector of claim 2 in which the direction detector means comprises digitizer means having a shaft adapted to mating with the stylus means and a digital output indicative of shaft position, whereby the direction of pen movement is directly represented as a digital number.

9. The detector of claim 8 in which the digitizer means comprises a clear disk mounted coaxially on the shaft, a plurality of photodetectors fixedly mounted to the handle means along a radius of the disk, a plurality of light sources mounted so as to shine through the disk on the photodetectors, and a plurality of opaque stripes on the disk coaxially arranged in a predetermined pattern so as to block the light passing between light source and photodetectors, whereby the arrangement of light and dark represents a digital encoding of shaft position.

10. The detector of claim 9 in which the stylus means is mounted at one end of an offset arm, the other end of which is attached to the shaft of the digitizer means, whereby the draw of stylus movement on the writing surface causes the digitizer shaft to turn.

11. The detector of claims 5 or 9 in which the stylus means comprises a disk rotatably mounted perpendicular to the shaft.

12. The detector of claim 11 in which the stylus means further comprises means for determination of the direction of disk rotation.

13. The detector of claim 12 in which the means for determination of the direction of disk rotation comprises a photodetector and light source mounted on opposite sides of the disk such that the light from the light source shines through the disk onto the photodetector; a plurality of light transmissive areas around the circumference of the disk adapted to permitting an increasing or decreasing amount of light to fall upon the photodetector, depending upon the direction the disk is rotating; and differentiator means for generating pulses from the output of the photodetector, whereby the polarity of the pulses indicates the direction of wheel rotation and the count of pulses provides a measure of distance traversed by the stylus across the writing surface.

14. The detector of claim 2 further comprising means for indicating spaces between characters.

15. A character recognition system comprising:
 a. A plurality of closed-loop detectors, each comprising:
   1. handle means for grasping by a user;
   2. stylus means for contacting and moving across a writing surface for writing thereon operably located at one end of the handle means;
   3. switch means connected to said pen means for generating a "pen-down" signal for indicating contact between the stylus means and the writing surface;
   4. direction detector means for cooperating with the stylus means for generating a signal indicative of a plurality of directions of stylus means motion on the writing surface;
   5. said direction detector means being constrained to move only from one of the plurality of detected directions to the next adjacent direction;
 b. processor means for accepting data from the detectors and producing data strings indicating the path traveled;
 c. decoder means for decoding the data from the processor means, comprising:
   1. memory means for storing known character patterns and associated characters;
   2. matching means for comparing the data string from the processor means to the known character patterns stored in the memory means;
   3. output means for indicating which character is associated with the data string from the processor means.

16. The system of claim 15 further comprising unmatched character indicator means for signaling that the detector has entered an unknown character.

17. The system of claim 16 further comprising means for adding new character patterns to the memory means.

* * * * *